US008073896B2

(12) United States Patent
Huckins

(10) Patent No.: US 8,073,896 B2
(45) Date of Patent: *Dec. 6, 2011

(54) CLIENT MESSAGING IN MULTICAST NETWORKS

(75) Inventor: Jeffrey L. Huckins, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/752,183

(22) Filed: Apr. 1, 2010

(65) Prior Publication Data

US 2010/0198929 A1 Aug. 5, 2010

Related U.S. Application Data

(62) Division of application No. 09/652,168, filed on Aug. 31, 2000, now Pat. No. 7,720,903.

(51) Int. Cl.
*G06F 15/16* (2006.01)

(52) U.S. Cl. ........................ 709/200; 717/173; 725/33

(58) Field of Classification Search ................. 379/230; 706/47; 725/33; 709/229, 202, 203, 206, 709/245; 365/230.03
See application file for complete search history.

(56) References Cited

U.S. PATENT DOCUMENTS

| 5,260,778 | A | * | 11/1993 | Kauffman et al. | 725/33 |
| 5,561,637 | A | * | 10/1996 | Dan et al. | 365/230.03 |
| 5,953,404 | A | * | 9/1999 | Fikis et al. | 379/230 |
| 6,236,983 | B1 | * | 5/2001 | Hofmann et al. | 706/47 |
| 6,330,611 | B1 | * | 12/2001 | Itoh et al. | 709/229 |

* cited by examiner

*Primary Examiner* — Dustin Nguyen
(74) *Attorney, Agent, or Firm* — Trop, Pruner & Hu, P.C.

(57) ABSTRACT

A messaging system may enable a server to assign unique identifiers to a plurality of clients. These identifiers enable a client to determine whether a message is specifically targeted to that client or, as an alternative, whether the client is a member of a group of targeted clients. In one embodiment, each client includes a client identifier that may include code portions that are common to other members of a particular addressable client group. In addition, the client may include agents devoted to particular functions that may be uniquely addressable by the server.

12 Claims, 3 Drawing Sheets

CLIENT MESSAGING IN MULTICAST NETWORKS

CROSS-REFERENCE TO RELATED APPLICATIONS

This application is a divisional of U.S. patent application Ser. No. 09/652,168, filed on Aug. 31, 2000, now U.S. Pat. No. 7,720,903.

BACKGROUND

This invention relates generally to providing messages to clients in multicast networks.

A multicast network may enable messages to be sent to target groups of clients that constitute a subset of all of the networked clients. Generally, multicasting is accomplished by including, within a header for example, the addresses of all the subject clients that are addressed. Including a large number of addresses with a packet has the distinct disadvantage that the message size can become very enlarged in networks with many clients. In particularly large networks, such as those that have nationwide coverage, the bandwidth of the network may be adversely affected by the need to include, within the message, addresses for a large subset of the clients on the network.

Thus, there is a need for ways to address a subset of clients within a network in a bandwidth efficient fashion.

In some cases, a given client may receive a variety of different types of messages. As one example, it may be desirable to transmit software updates (that update the software on a group of clients) through a multicast network system. Thus, each client may receive conventional messages as well as software updates. Conventionally, there is no way for the client that receives a message to immediately determine what to do with the message.

Thus, there is a need for a way to enable network clients to better handle diverse types of messages that may be received by the client.

DETAILED DESCRIPTION

Figure 1:
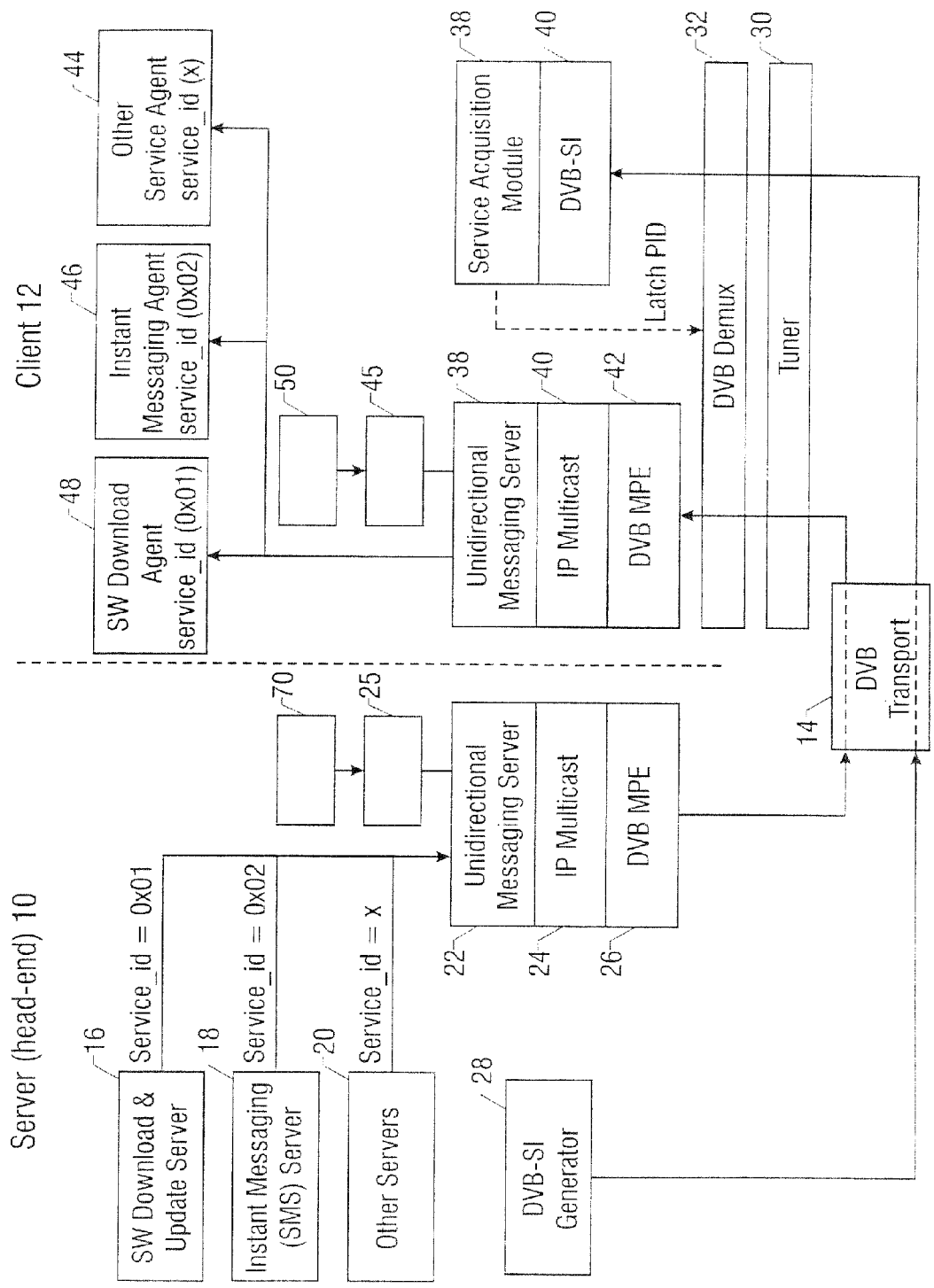
FIG. 1 is a schematic depiction of one embodiment of the present invention.

Referring to FIG. 1, a network may include at least one server or head-end 10 and a plurality of clients 12 (only one of which is shown). The server 10 may be coupled to a plurality of clients (including the client 12) through a distribution system that may be based on a wired system or a wireless or broadcast system. Examples of such networks include television distribution networks such as digital video broadcasting systems.

In one embodiment of the present invention, the server 10 may communicate with the clients 12 over a transport 14. The transport 14 may be in accordance with an analog or digital broadcasting system. As one example, the transport 14 may be compliant with the Digital Video Broadcast (DVB); Network-independent Protocol, ETS 300802, dated November 1997 and available from the European Telecommunications Standards Institute (ETS), Valbonne, France. The transport 14 may be a satellite, cable or airwave broadcasting system as examples.

In accordance with embodiments of the present invention, the client 12 recognizes messages directed individually to that client 12 from the server 10 or in some embodiments, from other clients 12. Bandwidth may be conserved by addressing messages to a group of clients without the need to insert, within header, the individual identifiers of each of a large number of addressed clients.

In addition, the client 12 may include one or more addressable agents 44, 46 and 48 that may be independently addressed by remote units such as the server 10. Moreover, by providing addressable agents 44, 46 and 48 within a given client 12, messages that are specialized or which need specialized handling may be addressed to particular agents resident on the client 12 for appropriate handling.

The server 10 may include a software download and update server 16. The server 16 is responsible for transmitting software or software updates to the client 12. The server 16 transmits messages which include a distinct service identifier (e.g., service_id=0x01).

The server 10 may also include an instant messaging or short message service (SMS) server 18 that also transmits messages having a distinct service identifier (e.g., service_id=0x02). The server 10 may also have any number of additional servers indicated collectively at 20 that may transmit messages, each having a unique service identifier (e.g., service_id=X).

In accordance with one embodiment of the present invention, the server 10 may implement a unidirectional messaging system. In a unidirectional messaging system, the server 10 may transmit messages to a plurality of clients that are unable to respond in any way. One example of such a network is a direct-to-home (DTH) broadcast network that may be compliant with the DVB protocol. The network may use a connection oriented communication protocol or a real time connectionless communication protocol as two examples. There are many applications of unidirectional messaging from server to client such as instant messaging, command and control and notification and signaling, as examples. In other cases, the network may be a bidirectional network, for example with an Internet Protocol (IP) multicast backbone.

In one embodiment of the invention, the server 10 may include a unidirectional messaging server (UMS) 22 that is coupled to the servers 16, 18 and 20 to generate messages in an appropriate format. The messages transmitted by the UMS server 22 may include messages originally generated by one of the servers 16, 18 or 20. The UMS server 22 may then be coupled to an Internet Protocol multicast module 24 that places the messages in an appropriate multicast protocol format. Finally, a DVB Multiprotocol Encapsulation (MPE) 26 is coupled to the Internet protocol multicast module 24. The MPE is described in DVB Specification for Data Broadcasts (EN 301 192) and Specification for Service Information (SI) in DVB Systems (EN 300 468 V1.3.1 1998-02) both available from the ETS. The output of the DVB MPE 26 and a DVB-Service Information (SI) generator 28 are coupled to the transport 14. Service Information is digital data describing the delivery system, content and scheduling/timing of broadcast data streams.

In the client 12, the stream from the DVB-SI generator 28 is coupled to a DVB-SI receiver 40 and service acquisition module 38. The service acquisition module 38 extracts a program identifier (PID) and provides it to a DVB demultiplexer 32. A tuner 30 may tune the client 12 to the appropriate channel corresponding to the extracted program identifier.

The message from the DVB MPE 26 is provided to a DVB MPE receiver 42. The receiver 42 communicates with an IP multicast module 40 and a unidirectional messaging server 38. The server 38 breaks down the message to determine whether a service identifier was included in the data stream. If so, the message is forwarded to an appropriate agent designated to receive messages with particular service identifiers.

Thus, in one embodiment of the present invention, the software download and update server 16 may provide a specific message identifier that causes its message to be received by a software download agent 48 tuned to a particular service identifier. Similarly, messages from the instant messaging server 18 may include a service identifier that cause those messages to be forwarded to an instant messaging agent 46 in the client 12. Likewise, messages from other servers 20 may have appropriate identifiers that cause them to be shunted to particular agents 44 on the client 12.

The server 10 may include a storage 25 that stores software 70 for controlling the operation of the server 22. Likewise, the server 38 on the client 12 may be coupled to a storage 45 that stores software 50 that controls the operation of the server 38. The servers 22 and 38 may also be processor-based systems.

Figure 2:
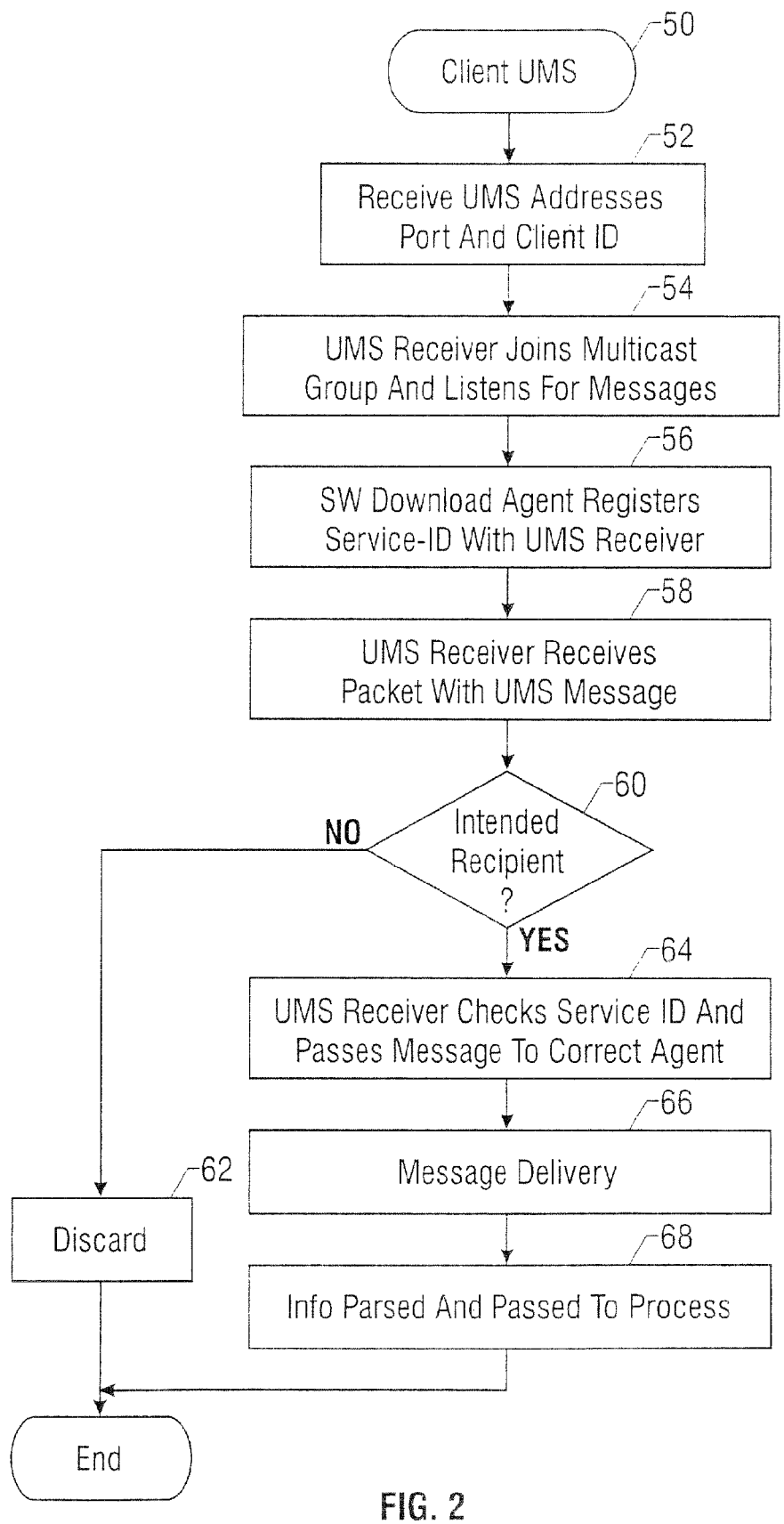
FIG. 2 is a flow chart for software resident on the client shown in FIG. 1 in accordance with one embodiment of the present invention.

Turning next to FIG. 2, the software 50 on the client 12 initially receives the unidirectional messaging server address and port from the server 10. The client 12 may also be assigned a client identifier as indicated in block 52. Thus, an Internet Protocol multicast system may be established wherein each client has a UMS address and port as well as a unique client identifier, assigned by the server 10. In some embodiments, the server 10 may dynamically adjust addresses and ports as well as client identifiers to enable communication of particular messages, message groups or types of messages to particular clients in a dynamic and reconfigurable fashion.

Having received its address, port and client identifier, the client 12 receiver joins a multicast group and listens for messages addressed specifically to it or to any groups that the client 12 belongs to, as indicated in block.

A software download agent 48 registers its service identifier with the UMS server 38 as indicated in block 56. When the UMS server 38 receives a packet with a UMS message, as indicated in block 58, a check determines whether the particular client 12 is the intended recipient as indicated in diamond 60. If not, the message is discarded as indicated in block 62.

However, if the particular client 12 is the intended recipient, the server 38 checks the message's service identifier and passes the message to the correct agent 44, 46 or 48, as indicated in block 64. The message is then delivered to the appropriate agent 44, 46 or 48, as indicated in block 66. In the agent, the information is parsed and passed to an appropriate process for handling as indicated in block 68.

Figure 3:
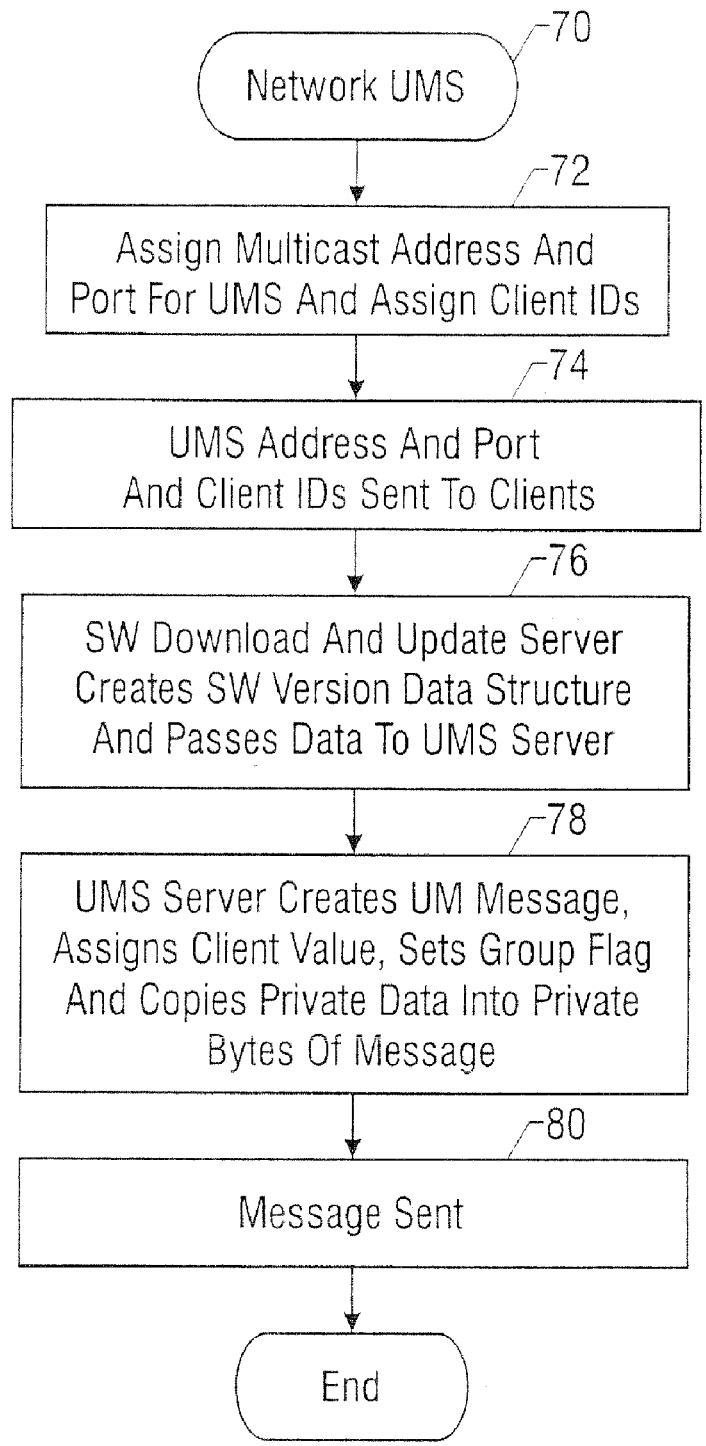
FIG. 3 is a flow chart for software resident on the server or head end in accordance with one embodiment of the present invention.

On the server side, shown in FIG. 3, the network software 70 begins by assigning multicast addresses and ports for unidirectional messaging service to a plurality of clients 12 as indicated in block 72. The server 10 may also assign client identifiers in a dynamic and reconfigurable fashion. The address, port and client identifiers are then transmitted to the clients as indicated in block 74.

Thereafter, the software download and update server 16 may create a software version data structure and pass this data to the server 22 as indicated in block 76. The server 22 creates a unidirectional message and assigns a client value, sets a group flag, and copies private data in the private bytes of the message as indicated in block 78. More particularly, a unique client identifier may be assigned. The client identifier may either be a particular preassigned client identifier or, as one example, may be zero when multiple clients are targeted. A group flag may be a Boolean value specifying whether the client identifier is a group mask or a particular identifier. A group mask is an identifier that identifies a subset of the clients 12 on the network. This subset may include a plurality of clients but less than the total number of addressable clients.

As one example of a undirectional message header, the message may include a number of variables including a group_mask, a service_id, a version_Id, a message_id, and a private_data_byte. The group_mask may, in one embodiment of the present invention, include 64 bits, the service_id may include eight bits, the version_id may include sixteen bits, the message_id may include eight bits and the private_data_byte may include eight bits. The group_mask may be exclusive ORed with the client identifier of each unique client 12 to determine if the client 12 is the intended recipient. The version_id is the version of the unidirectional messaging protocol and may initially be set to zero. The service_id may be a service identifier that may be as two examples 0x01 for a software and download and update service or 0x02 for an instant messaging service. Advantageously, the message size does not exceed 1,024 bytes in order to eliminate potential datagram fragmentation. The group_filter may be used in conjunction with the client_id field to limit the size of the private data bytes required for an application. Each of header items may include an unsigned integer most significant bit first (uimsbf) identifier in accordance with the DVB specification except for the private_data_byte which may include a bit string, left bit first (bslbf) identifier.

As indicated in block 80, the message is then sent to all the clients 12 on the network. Each client then determines whether the message is intended for that client. The client 12 determines whether it is the specific intended recipient by determining whether the message is addressed to the client identifier of the client 12. For example, using an AND logic operator between the message's identifier and the client's identifier, the client 12 may determine if the client 12 is within a group of clients jointly addressed by the server 10.

In one embodiment of the present invention, distinct groups of users may receive common client identifier elements. Thus, a plurality of clients whose owners have signed up for enhanced service may include a common code portion in their client identifier. When a message including that common code portion in the client identifier is received, each of those clients accepts the message. Likewise, clients in particular geographic areas, having particular interests or otherwise identifiable clients may be given unique prefixes/suffixes or identifier code portions. The code portion may be logically ANDed with a group_mask to determine whether a particular client is a member of the targeted group.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
assigning one identifier to identify both a set of client systems each having at least one addressable agent and at least one subset of less than all of said client systems within the set of client systems;
sending a message simultaneously to the set of client systems; and enabling a first client system in the set of client systems to determine whether the message is directed to the first client system or to the subset of client systems.

2. The method of claim 1 including sending television content to the set of client systems, wherein the message is embedded in service information data sent with the television content.

3. The method of claim 1 including comparing a group identifier, received by a client system with a message, to the client system's individual identifier to determine whether the particular client system is within the subset of client systems.

4. The method of claim 1 wherein enabling the first client system further comprises enabling the first client system to determine if the message includes a service identifier corresponding to the at least one addressable agent.

5. The method of claim 4 further comprising processing the message in the at least one addressable agent if the message is directed to the first client system.

6. The method of claim 1 wherein assigning the individual identifier comprises assigning a unidirectional messaging system (UMS) address and port and a unique client identifier to each of the set of client systems.

7. The method of claim 6 further comprising dynamically adjusting the UMS address and port of at least one of the set of client systems.

8. An article comprising a non-transitory tangible medium storing instructions that enable a processor-based system to:

assign one identifier to identify both a set of client systems each having at least one addressable agent and at least one subset of less than all of said client systems within the set of client systems;

send a message simultaneously to the set of client systems; and enable a first client system in the set of client systems to determine whether the message is directed to the first client system or to the subset of client systems.

9. The article of claim 8 further storing instructions that enable the processor-based system to send television content to the set of client systems, wherein the message is embedded in service information data sent with the television content.

10. The article of claim 8 wherein enabling the first client system further comprises enabling the first client system to determine if the message includes a service identifier corresponding to the at least one addressable agent.

11. The article of claim 10 further storing instructions that enable the processor-based system to process the message in the at least one addressable agent if the message is directed to the first client system.

12. The article of claim 8 further storing instructions that enable the processor-based system to compare a group identifier, received by a client system with a message, to the client system's individual identifier to determine whether the client system is within the subset of the client systems.

* * * * *